United States Patent
Kotary et al.

(10) Patent No.: US 11,429,289 B2
(45) Date of Patent: Aug. 30, 2022

(54) MEMORY MAP PROTECTION MECHANISM

(71) Applicant: Intel Corporation, Santa Clara, CA (US)

(72) Inventors: Karunakara Kotary, Portland, OR (US); Pannerkumar Rajagopal, Bangalore (IN); Sahil Dureja, Kamal (IN); Mohamed Haniffa, Tirunelveli (IN); Prashant Dewan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/832,125

(22) Filed: Mar. 27, 2020

(65) Prior Publication Data
US 2020/0285403 A1    Sep. 10, 2020

(51) Int. Cl.
| G06F 3/06 | (2006.01) |
| G06F 13/16 | (2006.01) |
| G06F 9/4401 | (2018.01) |

(52) U.S. Cl.
CPC .......... *G06F 3/0622* (2013.01); *G06F 3/0659* (2013.01); *G06F 3/0679* (2013.01); *G06F 9/4406* (2013.01); *G06F 13/1668* (2013.01)

(58) Field of Classification Search
CPC .... G06F 3/0622; G06F 3/0659; G06F 9/4406; G06F 13/1668; G06F 3/0679; G06F 21/79; G06F 9/4403; G06F 12/1416
See application file for complete search history.

(56) References Cited

U.S. PATENT DOCUMENTS

| 6,343,324 | B1 * | 1/2002 | Hubis | G06F 3/0622 |
| | | | | 709/229 |
| 11,005,936 | B1 * | 5/2021 | Liu | G06F 3/0622 |
| 2005/0086508 | A1 * | 4/2005 | Moran | G06F 12/1441 |
| | | | | 726/26 |
| 2015/0271139 | A1 * | 9/2015 | Lukacs | H04L 63/14 |
| | | | | 726/11 |
| 2015/0317089 | A1 * | 11/2015 | Ho | G06F 12/0638 |
| | | | | 711/102 |
| 2016/0216893 | A1 * | 7/2016 | Chen | G06F 3/0604 |
| 2018/0025150 | A1 * | 1/2018 | Shivanna | G06F 21/85 |
| | | | | 713/2 |
| 2019/0042780 | A1 * | 2/2019 | Brannock | G06F 21/74 |
| 2020/0285403 | A1 | 9/2020 | Kotary et al. | |
| 2020/0334171 | A1 * | 10/2020 | Meier | G06F 21/6218 |
| 2021/0091952 | A1 * | 3/2021 | Wentz | H04L 9/3278 |
| 2021/0334222 | A1 * | 10/2021 | Wood | G06F 12/1491 |

FOREIGN PATENT DOCUMENTS

CN    113448886    9/2021

OTHER PUBLICATIONS

"Computer Dictionary," 1994, Microsoft Press, 2nd Edition, p. 218, definition for "interface" (Year: 1994).*

* cited by examiner

Primary Examiner — Charles Rones
Assistant Examiner — Tong B. Vo
(74) Attorney, Agent, or Firm — Jaffery Watson Mendonsa & Hamilton LLP

(57) ABSTRACT

An apparatus to facilitate memory map security in a system on chip (SOC), is disclosed. The apparatus includes a micro controller to receive a request to grant a host device an access to a memory device and perform an alias checking process to verify accuracy of a memory map of the memory device.

20 Claims, 9 Drawing Sheets

MEMORY MAP PROTECTION MECHANISM

BACKGROUND OF THE DESCRIPTION

A system on chip (SOC) is an integrated circuit that integrates all components of a computer or other electronic system. These components include a central processing unit (CPU), memory, input/output (IO) ports and secondary storage, which are all included on a single substrate or microchip. Additionally, SOCs enable the integration of third party components via a standardized on-die interconnect protocol. However, the addition of such components may lead to security vulnerabilities.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit other equally effective embodiments.

DETAILED DESCRIPTION

In the following description, numerous specific details are set forth to provide a more thorough understanding of various embodiments. However, it will be apparent to one of skill in the art that the present embodiments nay be practiced without one or more of these specific details. In other instances, well-known features have not been described in order to avoid obscuring any of the techniques.

In embodiments, an on-chip secure micro controller is provided to intercept memory access grant requests initiated by boot firmware and perform an alias check of the memory map. In further embodiments, the micro controller performs an attestation of the memory map to one or more hosts or other system components.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
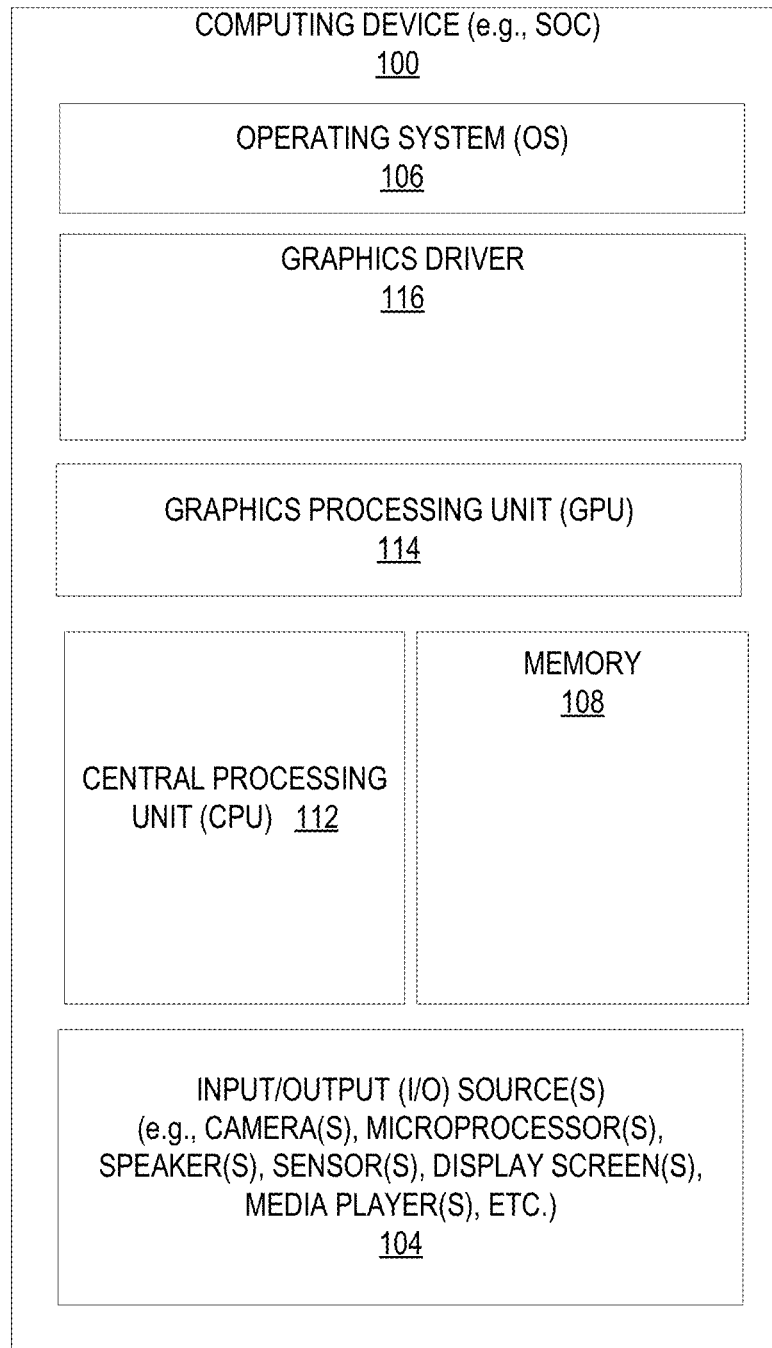
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
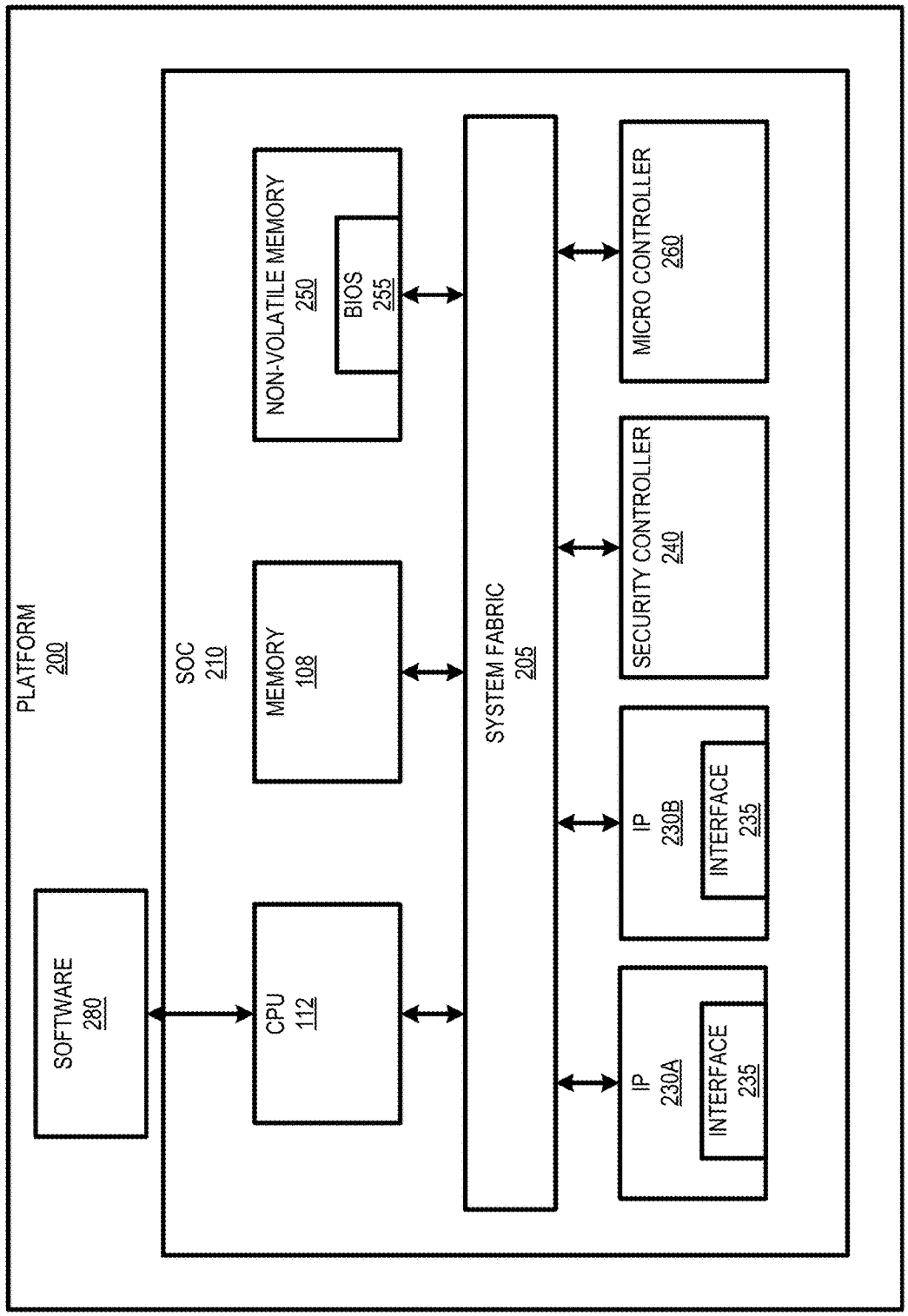
FIG. 2 illustrates one embodiment of a platform.

FIG. 2 illustrates one embodiment of a platform 200 including a SOC 210 similar to computing device 100 discussed above. As shown in FIG. 2, platform 200 includes SOC 210 communicatively coupled to one or more software components 280 via CPU 112. Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP blocks 230A and 230B) within SOC 210. In such an embodiment, the interconnect protocol provides a standardized interface to enable third parties to design logic such as IP agents 130 to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 to provide standardization to enable the IP agent 230 to communicate with SOC 210 components. For example, in an embodiment in which IPA agent 230 is a third party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises an IP agent 230 that is implemented to perform the security operations. Further, SOC 210 includes a non-volatile memory 250. Non-volatile memory 250 may be implemented as a Peripheral Component Interconnect Express (PCIe) storage drive, such as a solid state drives (SSD) or Non-Volatile Memory Express (NVMe) drives. In one embodiment, non-volatile memory 250 Basic Input/output System (BIOS) firmware 255 operates as boot firmware to perform hardware initialization during a power-on startup (or booting process).

Typically boot firmware is implemented to construct a system memory map for one or more SOC 210 memory devices (e.g., memory 108). A memory map is a data structure (e.g., typically included in the memory) that indicates how the memory is configured. Currently, the memory map programming performed by BIOS is programmed at the IP agents. However in this design the memory map is not verified prior to enabling memory access to the host CPU. This enforces security centric IP agents (e.g., security controller 240) to individually check aliases. Not having a centralized mechanism to perform alias checking and communicating an attestation to a host and other security elements is a big security gap, which forces security centric IPs to use alias checking code inside the SOC. Accordingly, the current alias checking process within an SOC is prone to security bugs and reduces responsiveness time.

According to one embodiment, SOC 210 includes a micro controller 260 to receive memory access grant requests initiated by BIOS 255 and enforce memory map checks and alias checks. In such an embodiment, BIOS boot firmware programs the memory map for all IP agents 230 prior to enabling host access (e.g., CPU 112) to memory 108. In a further embodiment, micro controller 260 attests a verified memory map result for each platform IP agent 230. In yet a further embodiment, a security centric IP agent (e.g., security controller 240) accepts and implements the memory map attested by micro controller 260, thus avoiding alias check duplication.

Figure 3:
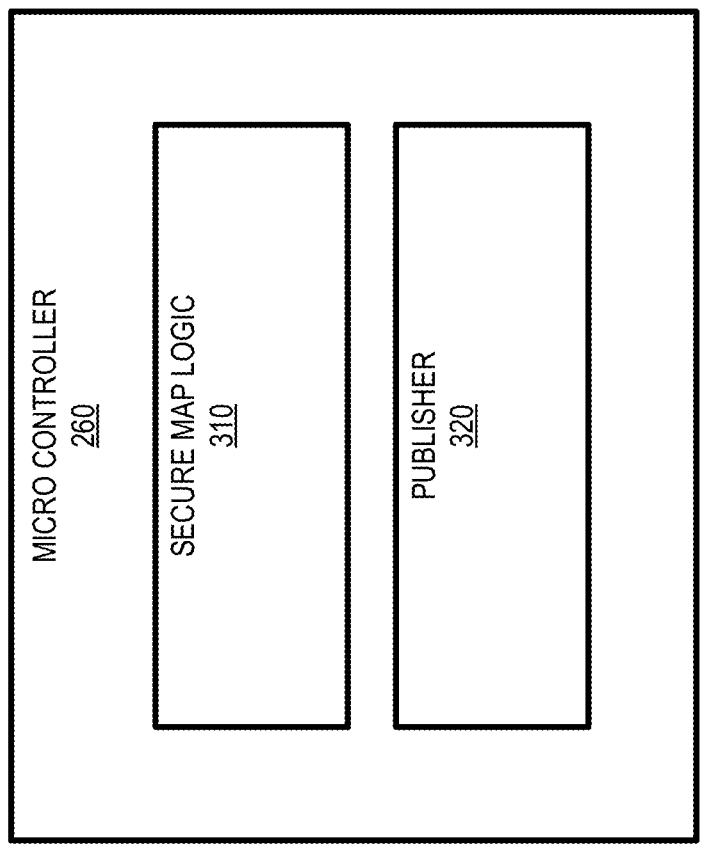
FIG. 3 illustrates one embodiment of a micro controller.

FIG. 3 illustrates one embodiment of micro controller 260. As shown in FIG. 3, micro controller 260 includes secure map logic 310 and publisher 320. According to one embodiment, secure map logic 310 performs a memory alias check to verify that a memory map generated by boot firmware is accurate and consistent. In such an embodiment, secure map logic 310 performs the memory alias upon receiving a request from boot firmware to enable host memory access.

Figure 4A:
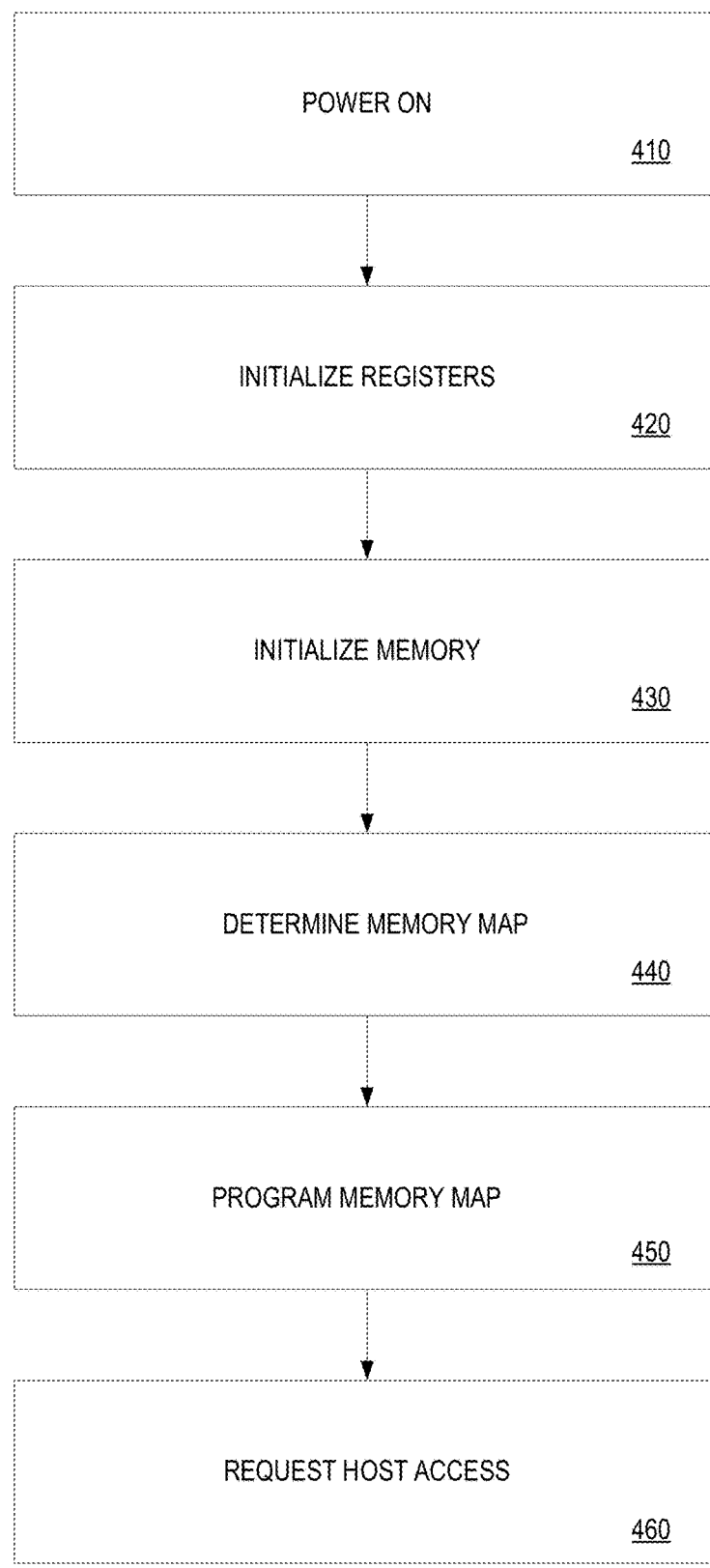
FIG. 4A is a flow diagram illustrating one embodiment of a boot process.
Figure 4B:
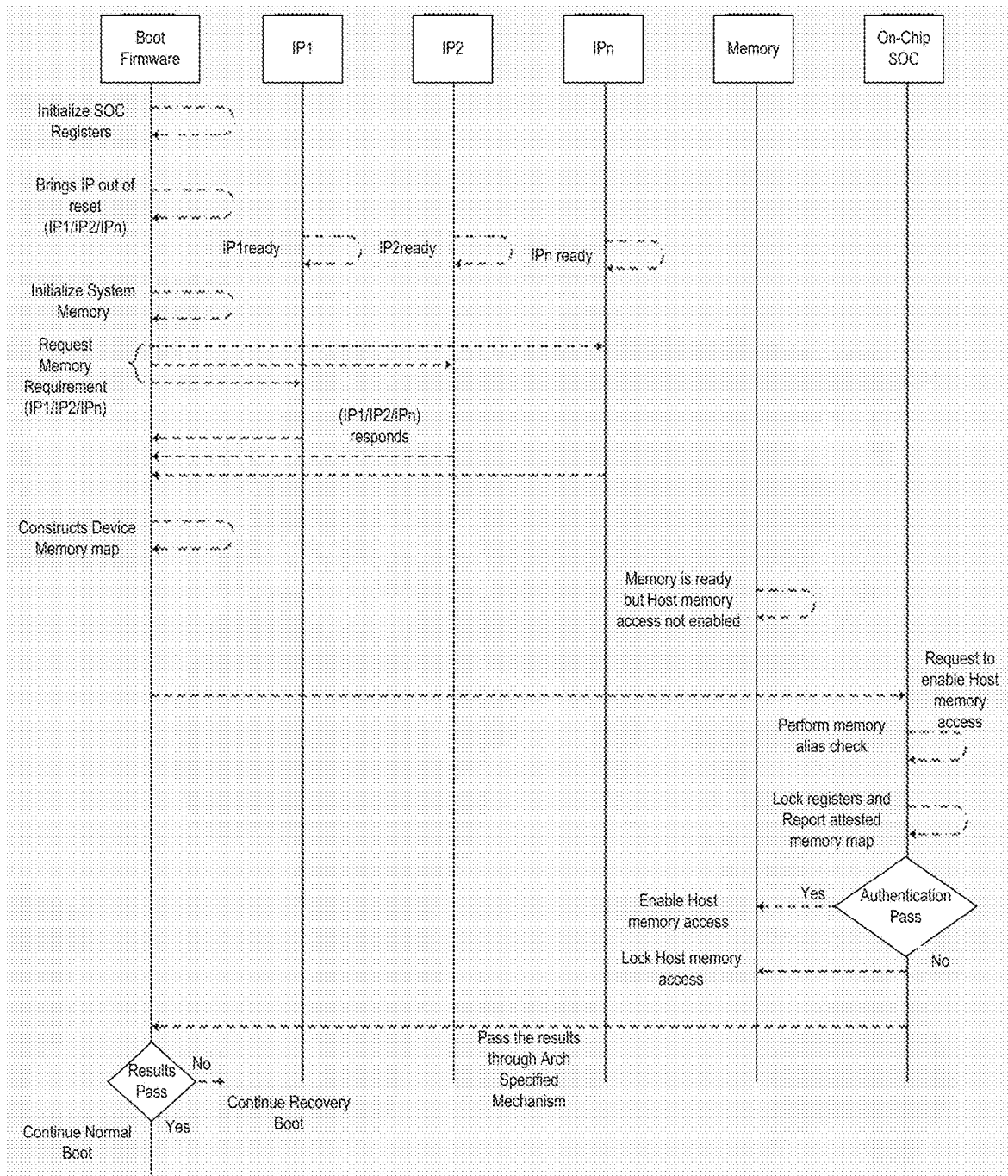
FIG. 4B is a sequence diagram illustrating another embodiment of a boot process.

FIG. 4A is a flow diagram illustrating one embodiment of a boot process performed by boot firmware. At processing block 410, platform 200 is powered on. At processing block 420, boot firmware initializes SOC 210 (e.g., CPU) registers and facilitates activation (e.g., bring out of reset) of IP agents 230. At processing block 430, memory 108 is initialized. In one embodiment, memory 108 is initialized via Memory Reference Code (MRC) logic (not shown) included in BIOS 255. MRC logic determines how memory 108 is to be read and written, and adjusts memory timing algorithms. At processing block 440, boot firmware determines memory requirements for each of the IP agents. At processing block 450, boot firmware programs the memory map at each IP agent 230. At processing block 460, boot firmware requests host access. FIG. 4B is a sequence diagram illustrating another embodiment of a boot process.

Upon receiving the request, secure map logic 310 performs the memory alias check by comparing a memory range across all IP agents 230 and verifying that one or more rules are adhered to (e.g., no range overlap, consistent range across all IP's, alignment rules etc.) across the IP agents 230. Once the alias check has been performed, secure map logic 310 locks registers associated with the memory map. In embodiments, secure map logic 310 locks the registers from further updates by setting IP agent 230 lock bits directly, or by requesting an IP agent 230 to lock registers itself and sending an acknowledgment to secure map logic 310 once locked. In a further embodiment, a Write Once register model is implemented for lock bits architecture. However in other embodiments, secure access policies to deny Host CPU access may be implemented.

Secure map logic 310 also performs a memory attestation process to verify the integrity of the memory map generated by boot firmware. In one embodiment, secure map logic 310 performs the attestation by storing integrity data and alias checking the results in an architectural defined status register. According to one embodiment, secure map logic 310 permits a host to access memory upon a determination that the attestation has passed (e.g., the integrity has been verified).

In yet a further embodiment, secure map logic 310 blocks access to memory upon determining that the attestation has failed (e.g., the integrity has not been verified). In such an embodiment, secure map logic 310 blocks access to memory via a hardware locking mechanism. Secure map logic 310 may block access by communicating with a memory controller at an IP agent 230, which sets architecture registers to grant or block access to memory.

Micro controller 260 also includes a publisher 320 to publish the results of the attestation to BIOS 255. In one embodiment, the results are published via a specification defined mechanism, such as model specific registers. Subsequently, BIOS polls the defined interface to take necessary actions based on platform 200 policy settings (e.g. success: REGULAR BOOT PATH, failure: FORCED HALT/RECOVERY PATH).

Figure 5:
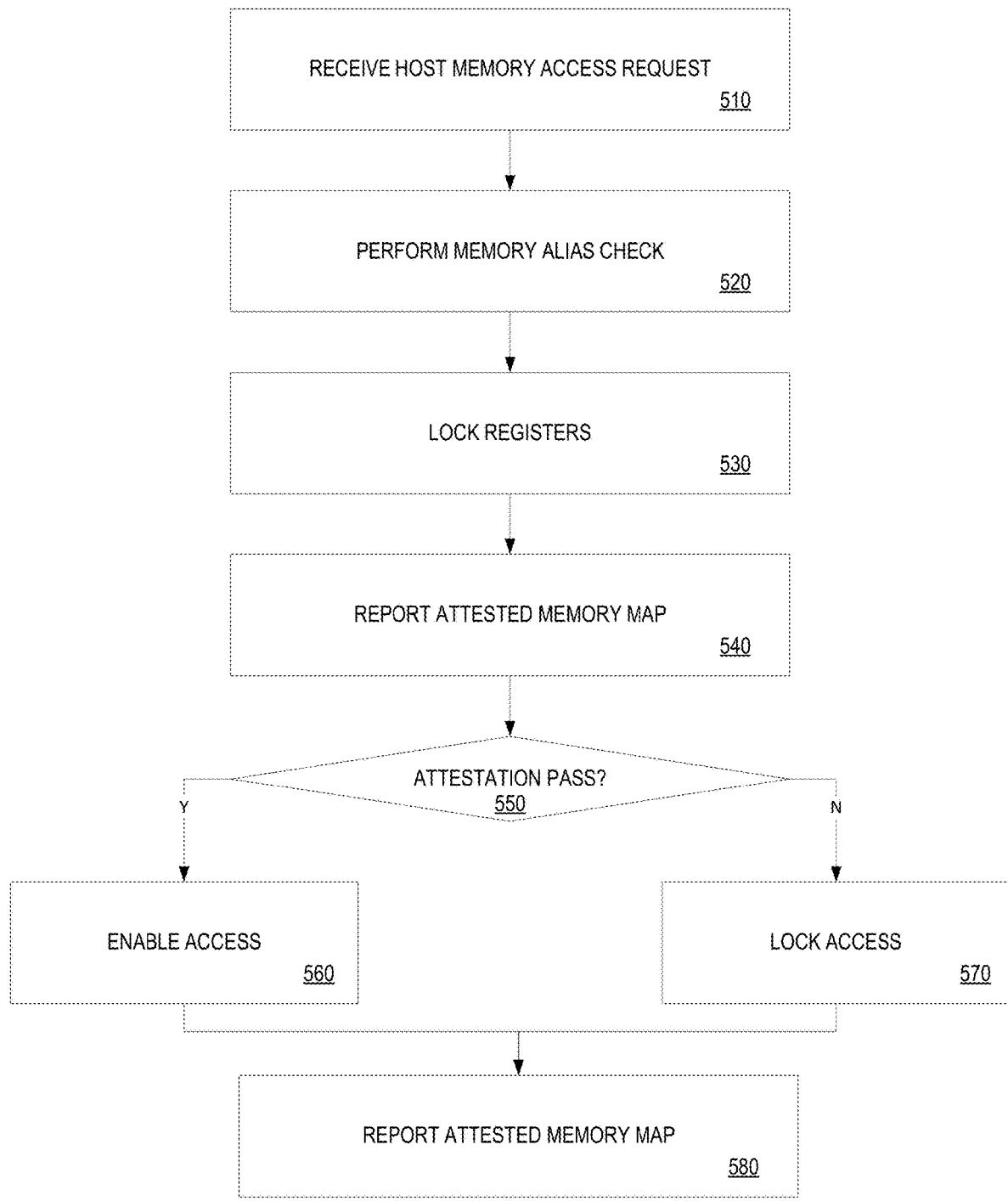
FIG. 5 is a flow diagram illustrating one embodiment of a process performed by micro controller.

FIG. 5 is a flow diagram illustrating one embodiment of a process performed by micro controller 260. At processing block 510, a host memory access is received (e.g., from boot firmware). At processing block 520, a memory alias check is performed. At processing block 530, registers associated with the memory maps are locked. At processing block 540, the attested memory map is reported. At decision block 550, a determination is made as to whether the attestation of the IP agents has passed. Memory access is enabled upon a determination that that the attestation has passed, processing block 560. Otherwise, memory access is locked, processing block 570. At processing block 580, the attested memory map is reported to the boot firmware. In one embodiment, a platform 200 user may be alerted in instances in which the attestation of the IP agents has not passed.

Figure 6A:
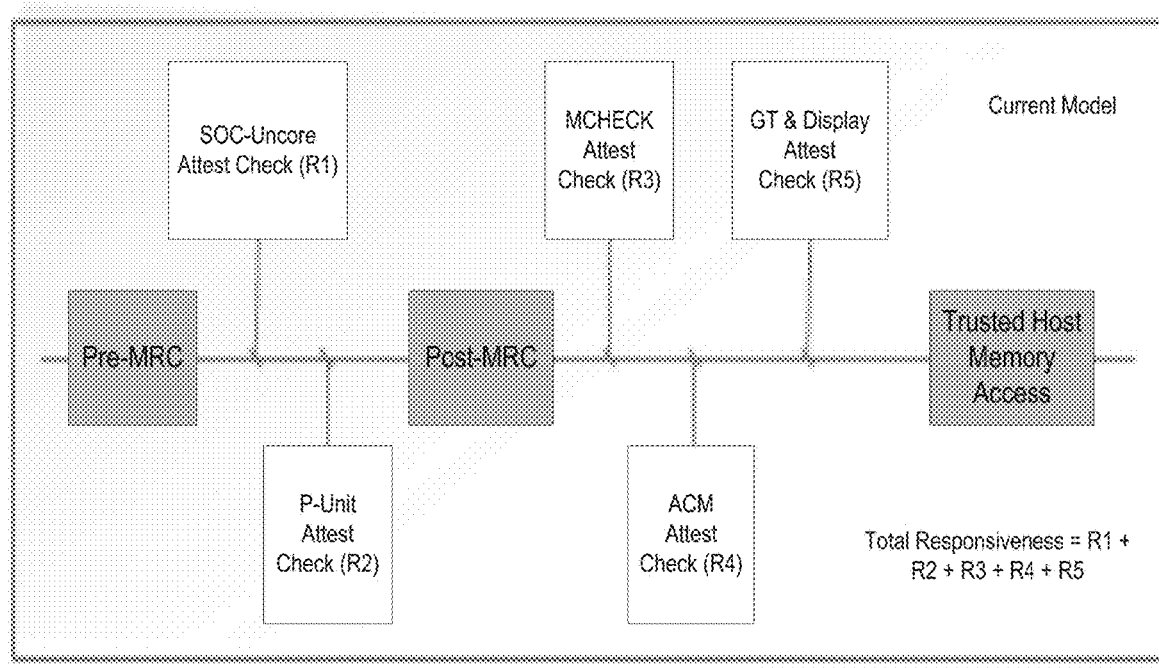
FIG. 6A illustrates a responsiveness impact associated with a conventional platform model.
Figure 6B:
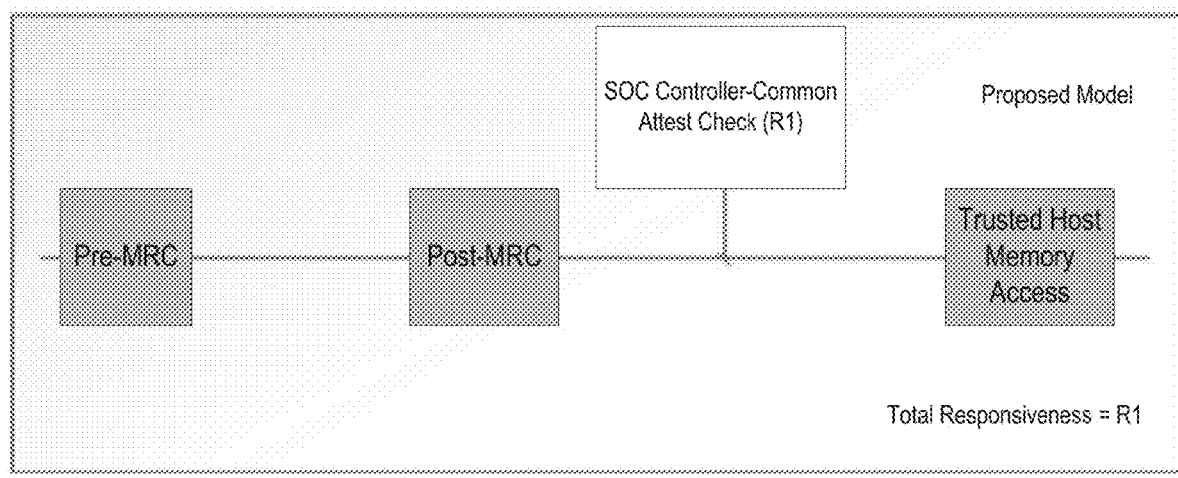
FIG. 6B illustrates one embodiment of a responsiveness impact associated with the disclosed platform model.

The above-described mechanism provides a one stop attestation and alias check solution in a SOC platform that permits host memory access only upon a determination that the attestation and alias check has passed. Accordingly, security threats to the SOC platform is mitigated. FIG. 6A illustrates a responsiveness impact associated with a conventional platform model, while FIG. 6B illustrates one embodiment of a responsiveness impact associated with the disclosed platform model.

Figure 7:
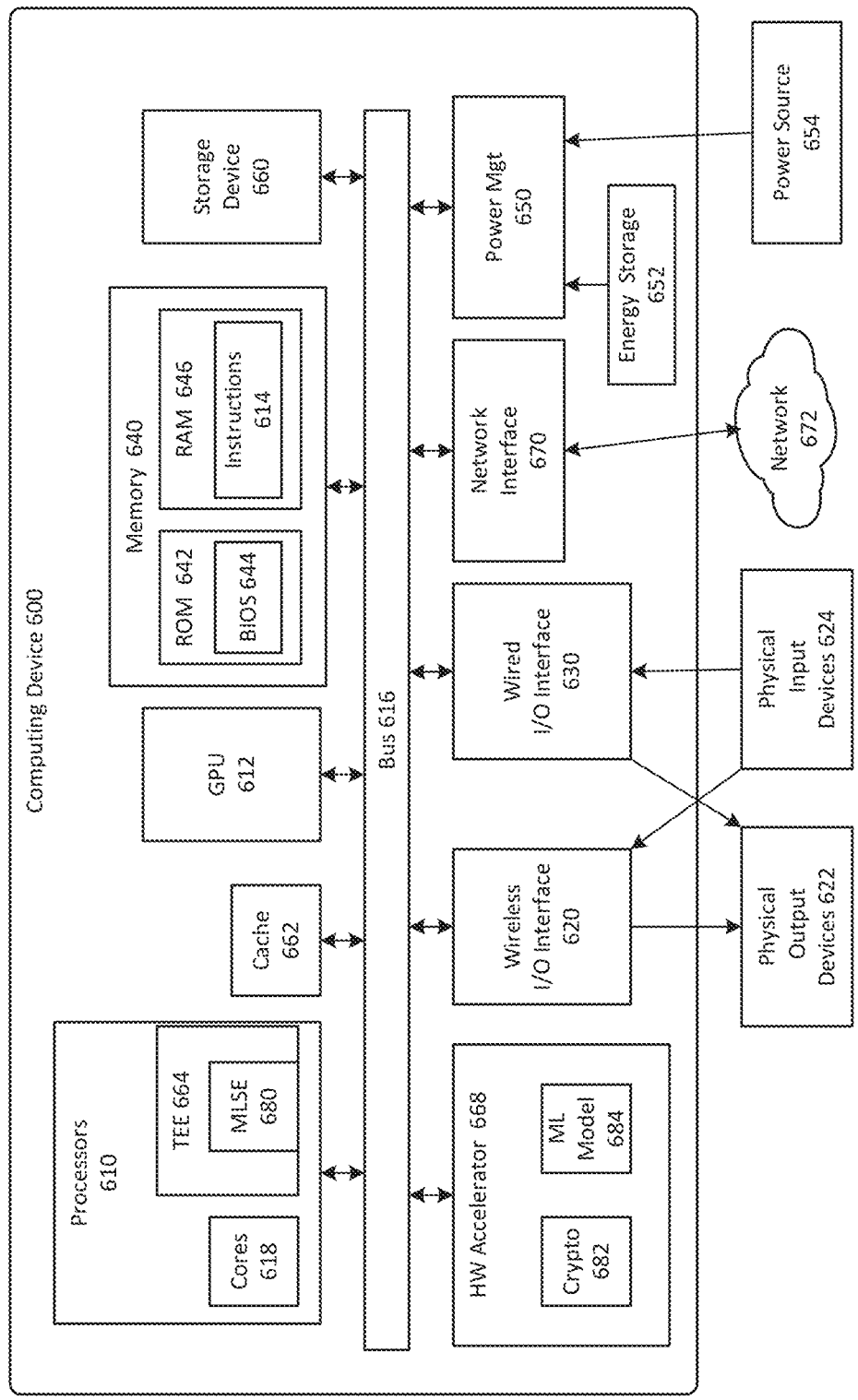
FIG. 7 is a schematic diagram of an illustrative of one embodiment of an electronic computing device.

FIG. 7 is a schematic diagram of an illustrative electronic computing device to enable enhanced protection against adversarial attacks according to some embodiments. In some embodiments, the computing device 600 includes one or more processors 610 including one or more processors cores 618 and a TEE 664, the TEE including a machine learning service enclave (MLSE) 680. In some embodiments, the computing device 600 includes a hardware accelerator 668, the hardware accelerator including a cryptographic engine 682 and a machine learning model 684. In some embodiments, the computing device is to provide enhanced protections against ML adversarial attacks, as provided in FIGS. 1-6.

The computing device 600 may additionally include one or more of the following: cache 662, a graphical processing unit (GPU) 612 (which may be the hardware accelerator in some implementations), a wireless input/output (I/O) interface 620, a wired I/O interface 630, memory circuitry 640, power management circuitry 650, non-transitory storage device 660, and a network interface 670 for connection to a network 672. The following discussion provides a brief, general description of the components forming the illustrative computing device 600. Example, non-limiting computing devices 600 may include a desktop computing device, blade server device, workstation, or similar device or system.

In embodiments, the processor cores 618 are capable of executing machine-readable instruction sets 614, reading data and/or instruction sets 614 from one or more storage devices 660 and writing data to the one or more storage devices 660. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 618 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 600 includes a bus or similar communications link 616 that communicably couples and facilitates the exchange of information and/or data between various system components including the processor cores 618, the cache 662, the graphics processor circuitry 612, one or more wireless I/O interfaces 620, one or more wired I/O interfaces 630, one or more storage devices 660, and/or one or more network interfaces 670. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 618 may include any number, type, or combination of currently available or future developed devices capable of executing machine-readable instruction sets.

The processor cores 618 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 616 that interconnects at least some of the components of the computing device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the computing device 600, for example by causing the processor cores 618 to load and/or execute one or more machine-readable instruction sets 614. In embodiments, at least some of the one or more machine-readable instruction sets 614 cause at least a portion of the processor cores 618 to provide, create, produce, transition, and/or function as a dedicated, specific, and particular machine, for example a word processing machine, a digital image acquisition machine, a media playing machine, a gaming system, a communications device, a smartphone, or similar.

The computing device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("FireWire"), and similar.

The computing device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the computing device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 618 and/or graphics processor circuitry 612 and/or one or more applications executed on or by the processor cores 618 and/or graphics processor circuitry 612. In some instances, one or more data storage devices 660 may be communicably coupled to the processor cores 618, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or Wi-Fi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 618 and/or graphics processor circuitry 612.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof.

For convenience, the processor cores 618, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 618 and/or the graphics processor circuitry 612. In some embodiments, all or a portion of the bus 616 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus to facilitate memory map security in a system on chip (SOC) comprising a memory device, a plurality of agents configured to access the memory device and a micro controller to receive a request to grant a host device access to the memory device and perform an alias checking process for each of the plurality of agents to verify accuracy of a memory map of the memory device.

Example 2 includes the subject matter of Example 1, wherein the micro controller locks registers associated with the memory map.

Example 3 includes the subject matter of Examples 1 and 2, further comprising a Basic Input/output System (BIOS) firmware to program the memory map for a plurality of agents.

Example 4 includes the subject matter of Examples 1-3, wherein the micro controller further performs an attestation process to verify the integrity of the memory map.

Example 5 includes the subject matter of Examples 1-4, wherein the micro controller permits the host device to access the memory device upon a determination that the integrity has been verified.

Example 6 includes the subject matter of Examples 1-5, wherein the micro controller blocks access to the host device upon a determination that the integrity has not been verified.

Example 7 includes the subject matter of Examples 1-6, wherein the micro controller blocks access to the host device via a hardware locking mechanism.

Example 8 includes the subject matter of Examples 1-7, wherein the micro controller publishes the results of the attestation to the BIOS firmware.

Some embodiments pertain to Example 9 that includes a method to facilitate memory map security in a system on chip (SOC), comprising receiving a request at a micro controller from Basic Input/output System (BIOS) firmware to grant a host device access to a memory device and perform access grant requests initiated by boot firmware, the micro controller performing an alias checking process to verify accuracy of a memory map of the memory device and the micro controller performing an attestation process to verify the integrity of the memory map.

Example 10 includes the subject matter of Example 9, further comprising the micro controller locking registers associated with the memory map.

Example 11 includes the subject matter of Examples 9 and 10, further comprising the micro controller permitting the host device to access the memory device upon a determination that the integrity has been verified.

Example 12 includes the subject matter of Examples 9-11, further comprising the micro controller blocking access to the host device upon a determination that the integrity has not been verified.

Example 13 includes the subject matter of Examples 9-12, wherein the micro controller blocks access to the host device via a hardware locking mechanism.

Example 14 includes the subject matter of Examples 9-13, further comprising the micro controller publishing the results of the attestation to the BIOS firmware.

Some embodiments pertain to Example 15 that includes a computing device comprising a processor, a memory device comprising a memory map, Basic Input/output System (BIOS) firmware to program the memory map for a plurality of agents, a fabric interface coupled between the processor, the memory device and the BIOS firmware and a micro controller, coupled to the fabric interface, to receive a request from the BIOS firmware to grant the processor access to the memory device and perform access grant requests initiated by boot firmware and perform an alias checking process to verify accuracy of a memory map of the memory device.

Example 16 includes the subject matter of Example 15, wherein the micro controller further performs an attestation process to verify the integrity of the memory map.

Example 17 includes the subject matter of Examples 15 and 16, wherein the micro controller permits the processor to access the memory device upon a determination that the integrity has been verified.

Example 18 includes the subject matter of Examples 15-17, wherein the micro controller blocks access to the processor device upon a determination that the integrity has not been verified.

Example 19 includes the subject matter of Examples 15-18, wherein the micro controller blocks access to the host device via a hardware locking mechanism.

Example 20 includes the subject matter of Examples 15-19, further comprising the plurality of IP agents coupled to the fabric interface.

The embodiments of the examples have been described above with reference to specific embodiments. Persons skilled in the art, however, will understand that various modifications and changes may be made thereto without departing from the broader spirit and scope as set forth in the appended claims. The foregoing description and drawings are, accordingly, to be regarded in an illustrative rather than a restrictive sense.

What is claimed is:
1. A method to facilitate memory map security in a system on chip (SOC), comprising:
receiving a request at a micro controller from a Basic Input/output System (BIOS) firmware to grant a host device access to a memory device and perform access grant requests initiated by a boot firmware;

the micro controller performing an alias checking process to verify accuracy of a memory map of the memory device that indicates how the memory device is configured for use by interconnect protocol (IP) agents, comprising:
comparing a memory range across each of the IP agents; and
verifying that one or more rules are adhered to across the IP agents;
the micro controller performing an attestation process to verify the integrity of the memory map; and
storing the memory map in cryptographic hardware;
wherein the micro controller in the SOC attests to each of the IP agents that the memory map has been verified;
wherein the alias checking process and the attestation are performed by the micro controller prior to enabling the access to the memory device for the host device, and
wherein there is no range overlap in the memory range across all of the IP agents.

2. The method of claim 1, further comprising the micro controller locking registers associated with the memory map.

3. The method of claim 1, further comprising the micro controller permitting the host device to access the memory device upon a determination that the integrity has been verified.

4. The method of claim 3, further comprising the micro controller blocking access to the host device upon a determination that the integrity has not been verified.

5. The method of claim 4, wherein the micro controller blocks access to the host device via a hardware locking mechanism.

6. The method of claim 3, further comprising the micro controller publishing the results of the attestation process to the BIOS firmware.

7. An apparatus to facilitate memory map security in a system on chip (SOC), comprising:
a memory device;
a plurality of interconnect protocol (IP) agents configured to access the memory device;
a micro controller to receive a request to grant a host device an access to the memory device and perform an alias checking process for each of the plurality of IP agents, the alias checking process verifies accuracy of a memory map of the memory device that indicates how the memory device is configured for use by the plurality of IP agents, wherein the micro controller performs the alias checking process by comparing a memory range across each of the IP agents and verifying that one or more rules are adhered to across the IP agents; and
cryptographic hardware to store the memory map;
wherein the micro controller in the SOC attests to each of the IP agents that the memory map has been verified;
wherein the alias checking process and the attestation are performed by the micro controller prior to enabling the access to the memory device for the host device, and
wherein there is no range overlap in the memory range across all of the plurality of IP agents.

8. The apparatus of claim 7, wherein the micro controller locks registers associated with the memory map.

9. The apparatus of claim 8, further comprising a Basic Input/output System (BIOS) firmware to program the memory map for the plurality of IP agents.

10. The apparatus of claim 9, wherein the micro controller further performs an attestation process to verify the integrity of the memory map.

11. The apparatus of claim 10, wherein the micro controller permits the host device to access the memory device upon a determination that the integrity has been verified.

12. The apparatus of claim 11, wherein the micro controller blocks access to the host device upon a determination that the integrity has not been verified.

13. The apparatus of claim 12, wherein the micro controller blocks access to the host device via a hardware locking mechanism.

14. The apparatus of claim 10, wherein the micro controller publishes results of the attestation process to the BIOS firmware.

15. A computing device comprising:
a processor;
a memory device;
a Basic Input/output System (BIOS) firmware to program a memory map that indicates how the memory device is configured for a plurality of interconnect protocol (IP) agents;
an integrated on-chip system fabric coupled between the processor, the memory device and the BIOS firmware;
a micro controller, coupled to the system fabric, to receive a request from the BIOS firmware to grant the processor access to the memory device and perform access grant requests initiated by a boot firmware and perform an alias checking process to verify accuracy of the memory map of the memory device, including comparing a memory range across each of the IP agents and verifying that one or more rules are adhered to across the IP agents; and
cryptographic hardware to store the memory map, wherein the memory map indicates how the memory is configured for use by the plurality of IP agents;
wherein the micro controller in the computing device attests to each of the IP agents that the memory map has been verified;
wherein the alias checking process and the attestation are performed by the micro controller prior to enabling the access to the memory device for the processor, and
wherein there is no range overlap in the memory range across all of the IP agents.

16. The computing device of claim 15, wherein the micro controller further performs an attestation process to verify the integrity of the memory map.

17. The computing device of claim 16, wherein the micro controller permits the processor to access the memory device upon a determination that the integrity has been verified.

18. The computing device of claim 17, wherein the micro controller blocks access to the processor upon a determination that the integrity has not been verified.

19. The computing device of claim 17, wherein the micro controller blocks access to the processor via a hardware locking mechanism.

20. The computing device of claim 15, further comprising the plurality of IP agents coupled to the system fabric.

* * * * *